United States Patent

[11] 3,549,860

| [72] | Inventors | Leslie Kearton Parker<br>High Wycombe;<br>John Tournier, Flackwell, Heath, England |
|---|---|---|
| [21] | Appl. No. | 826,196 |
| [22] | Filed | May 20, 1969 |
| [45] | Patented | Dec. 22, 1970 |
| [73] | Assignee | Perkin-Elmer Limited<br>Beaconsfield, Buckinghamshire, England<br>a corporation of Great Britain |

[54] TEMPERATURE CONTROL APPARATUS
7 Claims, 3 Drawing Figs.

[52] U.S. Cl. .................................................. 219/400,
219/371, 219/413; 126/21
[51] Int. Cl. ....................................................F27d 11/02,
F27d 19/00
[50] Field of Search .......................................... 219/400,
413, 375, 370—1; 126/21, 274; 99/251; 312/236;
263/2

[56] References Cited
UNITED STATES PATENTS

| 1,827,194 | 10/1931 | Grothe .......................... | 263/2 |
| 2,408,331 | 9/1946 | Mills ............................. | 219/400 |
| 2,906,620 | 9/1959 | Jung ............................. | 99/1 |
| 3,221,729 | 12/1965 | Beasley et al. ................. | 219/400X |
| 3,261,650 | 7/1966 | Stromquist .................... | 312/236 |
| 3,467,815 | 9/1969 | Robinson et al. .............. | 219/400 |

Primary Examiner—Volodymyr Y. Mayewsky
Attorney—Edward R. Hyde, Jr.

ABSTRACT: A thermally insulating outer enclosure is provided and a thermally insulating partition means is positioned within the enclosure and forms the boundary of a utilization space. The partition means is spaced in the enclosure to define as intermediate buffer space, an inflow opening and a juxtaposed outflow opening in the partition means. A heating means is provided and is adapted to cooperate with an impeller adjacent the inflow opening for circulating a temperature regulating fluid through the openings and the utilization space and the buffer space. A heat sensing means is positioned in the utilization space for providing output indications representative of the temperature at the openings and in the buffer space. The heat sensing means is coupled to the heating means for regulating the temperature thereof. The apparent temperature coefficient of a thermal mass in a utilization space is thereby variable by altering the position of the heat sensing means in the buffer space and a position may be found in which the coefficient is relatively close to zero.

TEMPERATURE CONTROL APPARATUS

This invention relates to thermostat arrangements for controlling temperatures within a confined space.

The invention relates more particularly to apparatus for controlling the temperature of an object in the space to relatively close limits when relatively wide ambient temperature changes occur.

In various apparatus there is a requirement for controlling operating temperatures to relatively close tolerances. For example, in a Nuclear Magnetic Resonance (NMR) Spectrometer a relatively large polarizing field is provided by a permanent magnet. The stability of this field can vary beyond acceptable limits when the temperature of the magnet varies by more than a few millidegrees. It is therefore desirable to closely regulate the temperature of the magnet in order to reduce variations.

In known thermostating arrangements a utilization space is furnished with a heating means which is controlled by a heat sensing means through a servo loop system in a manner tending to oppose temperature changes in said space. The utilization space is insulated from the ambient by suitable material of low thermal conductivity which merely acts as a static buffer. However, this arrangement is not adequate where it is essential to maintain an inner zone of a substantial thermal mass at a steady temperature. A case in point is that of the NMR magnet, wherein the temperature at an air gap of the magnet should be maintained relatively constant to a few millidegrees. Further, the thermostating of a large thermal mass, especially if it includes material of poor thermal conductivity, such as the cast iron yoke of an NMR magnet, is particularly difficult and in practice thermal gradients within the mass cannot be avoided.

Accordingly, it is an object of the invention to provide an improved thermostating arrangement.

Another object of the invention is to provide an apparatus for controlling the gradients across the thermal mass in a manner for providing that a thermal pivotal point where the temperature is substantially constant is established at an inner zone while the temperature at opposed peripheral zones may move up and down in seesaw fashion.

According to the present invention there is provided an apparatus for defining a utilization space and enabling an inner zone of a substantial thermal mass therein to be maintained within relatively close temperature limits, even when said mass when positioned in said utilization space exhibits significant temperature gradients between said inner zone and peripheral parts of the mass. The apparatus in accordance with the invention includes a thermally insulating outer enclosure and a thermally insulating partition means positioned within said enclosure and forming the boundary of a utilization space. The partition means is spaced from the enclosure to define an intermediate buffer space, an inflow opening and a juxtaposed outflow opening in said partition means. A heating means is provided and is adapted to cooperate with an impeller adjacent said inflow opening for circulating a temperature regulating fluid through the inflow opening, through the utilization space, and through the outflow opening and back to the inflow opening through the buffer space. A heat sensing means is positioned in the utilization space for providing mutually aiding electrical outputs representing the separate temperature integrals as sensed in the utilization space at the inflow opening, at the outflow opening, and as sensed in the buffer space at a suitable location intermediate between the two openings. The heat sensing means are coupled to a servoloop for controlling the heating means. The apparent temperature coefficient with respect to ambient of the inner zone of the thermal mass will be varied from a relatively small negative to a relatively small positive value, or vice versa, simply by altering the position of the heat sensing means in the buffer space relative to inflow and outflow openings so that a position may be found for which said coefficient is conveniently close to zero.

The evaluation of the separate temperature integrals is achieved by means of individual heat sensors, one or more at each site, for attenuating a single suitably graded heat sensor extending to the three sites.

A substantial thermal mass, e.g., a barrel-type permanent magnet for an NMR spectrometer, is positioned in the utilization space at a position intermediate the inflow opening and the outflow opening. The heat sensors at each of the three sites are arranged in relation to the thermal mass, the heating means and the rate of fluid flow, for establishing in or adjacent to the thermal mass a pivotal thermal zone which is conveniently located in relation to an inner zone of the thermal mass, e.g., the working gap zone of an NMR magnet. The action of the sensors is controlled by altering their positioning and/or adjusting their sensitivities. When the sensors are single-layer windings of copper wire upon a form, the sensitivity for a given gauge of wire may be decreased by reducing the number of turns.

In one arrangement the sensors are mounted with the utilization space relatively close to the inflow opening and positioned to produce a signal for temperature changes and a pair of similar sensors positioned relatively close to the outflow opening. In addition, there is provided a pair of sensors in the buffer space which contribute less to the overall mutual aiding relationship as compared with either of the outflow or the inflow sensors.

The thermostating arrangement is adapted for providing that when the heating means is controlled by the mutually aiding outputs of the sensors, and the buffer space sensors are positioned substantially midway between inflow and outflow opening, then the pivotal zone as observed for example by means of a temperature probe is at a convenient location in the utilization space between the two openings. A final adjustment of the pivotal zone is then made by shifting the buffer space sensors either toward the inflow opening or toward the outflow opening.

The invention is particularly advantageous where the thermal mass is a permanent magnet for an NMR spectrometer and the inner zone to be temperature controlled is the working gap zone of said magnet. Although it was long supposed that the whole mass of the magnet must be kept within very close temperature limits, it has been found that small temperature gradients can in fact be tolerated in the magnet provided a thermal pivotal zone is established which can be adjustably located in the working gap zone. For substantially zero temperature coefficient of the magnet, the center of the pivotal thermal zone need not necessarily coincide with the magnetic axis and that its location will generally vary from magnet to magnet of the same design due to small but nevertheless significant differences in materials and construction. Thus, when the invention is applied to an NMR magnet, the sensors in the buffer space are finally adjusted for best results as observed through the NMR spectrum. Operation relatively close to zero coefficient, i.e., apparent zero coefficient relative to ambient, has thus been achieved.

It should be understood that although the buffer space and the sensors therein provide a means of adjusting the location of the thermal pivotal zone in the utilization space while maintaining high thermal impedance between the two spaces, it has a further important function in stabilizing the pivotal zone in the face of ambient temperature changes. This constitutes in effect a dynamic buffer action which is not fully explained.

As used in the present context, the term "a substantial thermal mass" refers to a mass that is relatively large compared with the size of its inner zone to be controlled. If an object is in thermal contact with a surrounding large mass, the object may be regarded as the inner zone to be controlled. It is noted, however, that the invention is particularly useful when the inner zone is an inseparable part of a large thermal mass in a material of comparatively poor thermal conductivity, e.g., cast iron.

The apparatus of the present invention in one arrangement is combined with a servoloop system for controlling the heating means through the heat sensing means. A comparison circuit is provided by mutually aiding heat sensors and reference means and a comparison signal is made to drive an on-off controller or a proportional controller for the heating means.

The invention will now be described by way of example with reference to the accompanying diagrammatic drawings, wherein.

Figure 1:
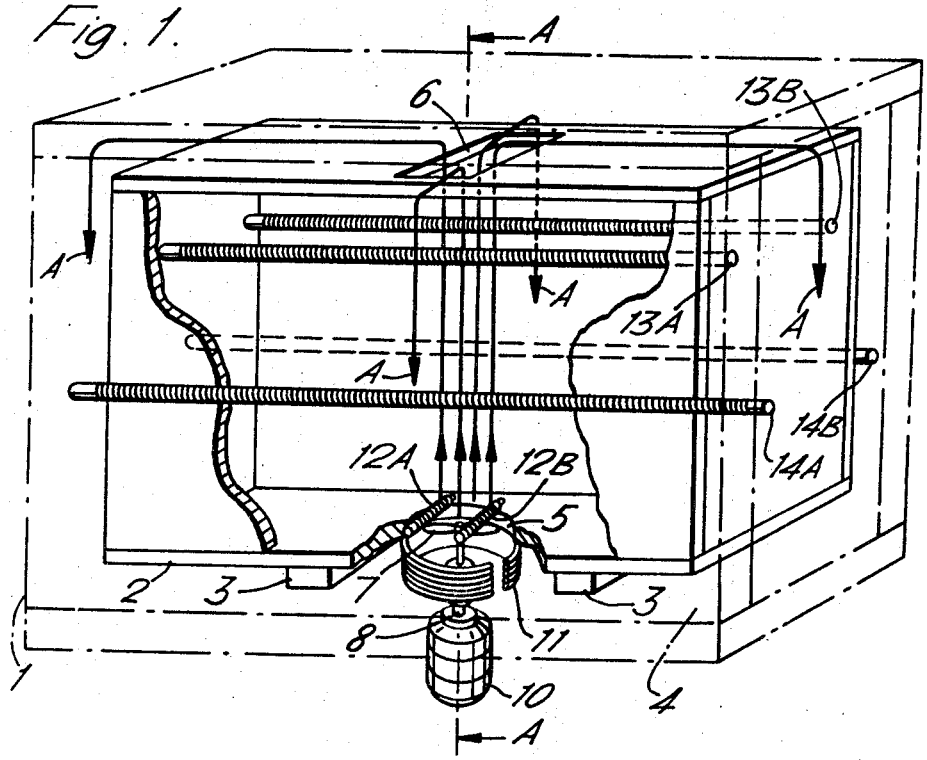
FIG. 1 is a perspective view, partly cut away, of an apparatus in accordance with the invention.

In FIG. 1, the outer enclosure is represented by an outer box 1 and the inner partition means by an inner enclosure box 2. The two boxes are kept in spaced relation on blocks 3 with an intervening air space 4 forming the buffer space. They are both fabricated from slabs of thermally insulating material some 2 inches and 1 inch thick, respectively. Inner box 2 forms the boundary of the utilization space for receiving a device or an object to be maintained at a substantially constant temperature. In an NMR spectrometer, a permanent barrel-type magnet is positioned in the utilization space with its magnetic axis parallel to the longitudinal axis of inner box 2 and the weight of the magnet is borne by the blocks 3. The magnet is not shown in the interest of simplification of the drawing. Similarly, the base on which the whole apparatus is mounted and the magnetic screening that would normally be provided around the outer box 1 is not illustrated. The inner box 2 is continuous except for an inflow opening 5 and a juxtaposed outflow opening 6. An impeller 7 mounted on shaft 8 rotatable in thermally insulating bushing 9 fitted to the bottom of outer box 1 is driven by an externally mounted synchronous electric motor 10. Impeller 7 is positioned just on the outside of inflow opening 5 and is surrounded in the buffer space 4 by heating means in the form of a heating coil 11 having a wide enough pitch to allow easy air flow therethrough.

A heat sensing means comprise a pair of inflow heat sensors 12A and 12B positioned just on the inside of inflow opening 5, a pair of outflow heat sensors 13A and 13B positioned a little below the outflow opening 6 and a pair of heat sensors 14A and 14B oppositely positioned in the buffer space between the inflow opening 5 and the outflow opening 6. The sensors are constructed from a length of insulated copper wire of small diameter wound on copper tubes.

Figure 3:
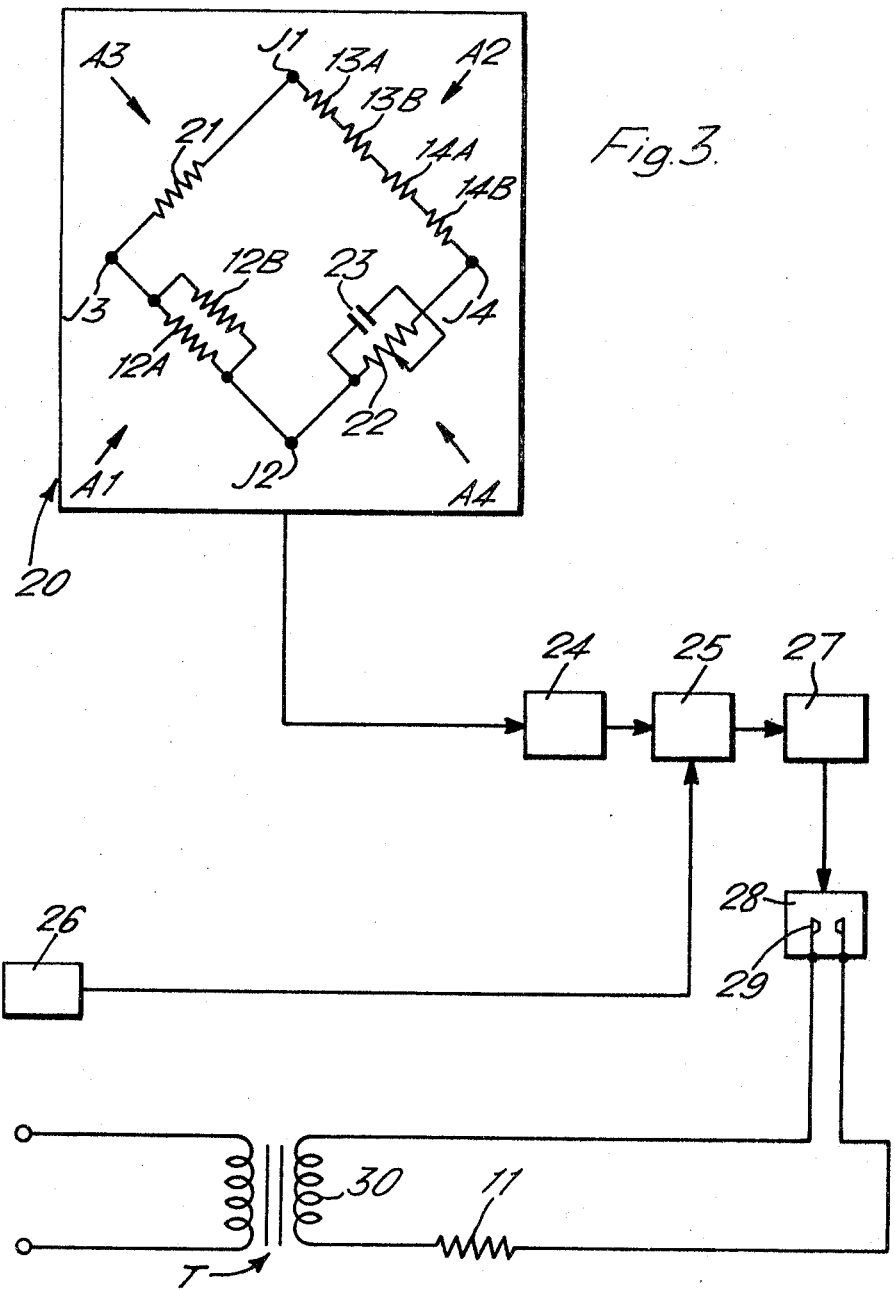
FIG. 3 is a block diagram of an electrical control system that may form part of the apparatus.

The manner in which the heat sensing means cooperate with the heating means will be described with reference to FIG. 3. The inflow heat sensors 12A and 12B each having a resistance of 44 ohms for example are coupled in parallel in one arm A1 of the Wheatstone bridge circuit, referenced generally as 20, and their equivalent parallel resistance is therefore 22 ohms. Outflow heat sensors 13A and 13B, each measuring 8 ohms for example, and buffer space heat sensors 14A and 14B, each measuring 5 ohms for example are coupled in series in a diagonally opposed arm A2, which thus provides an equivalent resistance of 26 ohms. All of the sensors are therefore mutually aiding and tend to unbalance the bridge in the same direction. Reference resistors 21 and 22 are coupled in arms A3 and A4, respectively, of the bridge circuit. The resistor 22 is adjustable in value and enables the balance point to be preset. The resistance value of arm A3 is substantially close to that of arm A1 and that of A4 substantially close to that of A3. A capacitor 23 for phase-shift correction of the bridge as a whole is connected across resistor 22.

The positioning of the sensors 12A and 12B relative to the inflow opening 5, the positioning of the sensors 13A and 13B relative to the outflow opening 6, the positioning of the sensors 14A and 14B in the buffer space and the total resistance of each pair of sensors are chosen for establishing with relation to the thermal mass of the magnet, the heating effect of the heating of the heating means and the rate of flow of the regulating air a thermal pivotal zone which is relatively close to the working gap zone of the NMR magnet. This desired result may be achieved by different combinations of the parameters referred to. A satisfactory selection is established relatively quickly by providing an air flow as high as convenient without inducing turbulence, by positioning the sensors in the utilization space as close as possible to the associated opening; and by adjusting the arms of the Wheatstone bridge to provide approximately equal impedance for maximum sensitivity. If, as in the described embodiment, the inflow sensors are coupled in one arm and the outflow sensors along with the buffer space sensors are coupled in a diagonally opposed arm and all the arms have approximately equal resistance, the positioning of the thermal pivotal zone is accomplished by adjusting the sensitivity of the buffer sensors in relation to the outflow sensors. To this end, with the buffer space sensors temporarily positioned midway between inflow and outflow opening, the sensitivities would be adjusted by trial and error until the thermal pivotal zone was brought as close as desired to the inner zone to be controlled.

The bridge 20 is excited by a 50 c.p.s. power supply coupled across junctions J1—J2 and the unbalance signal is picked up across junctions J3—J4, from which it is coupled to amplifier 24. A phase-sensitive detector 25 receives the amplified bridge signal from amplifier 24 and a reference signal from a 50 c.p.s. reference signal source 26. The output from detector 25 activates a Schmitt trigger 27 which controls a relay 28. A pair of contacts 29 close when the relay 28 is energized. Contacts 29 are coupled in series with the secondary 30 of a heater transformer T, the primary of which is fed from the 50 c.p.s. supply, and in series with the heating coil 11 (see also FIGS. 1 and 2). The parameters of the trigger circuit 27 are chosen to provide for a transition of state for temperature excursions exceeding plus or minus 2.5 millidegrees from the temperature corresponding to bridge balance. The "dead zone" thus provided in the servoloop as a whole is 5 millidegrees wide, which is adequate to prevent hunting.

Figure 2:
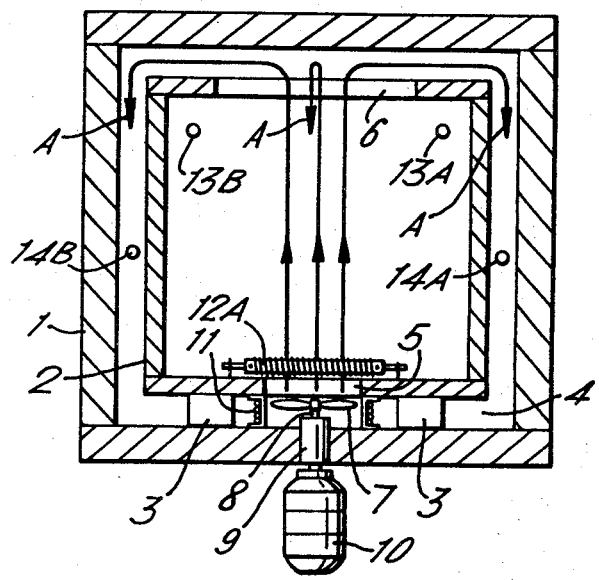
FIG. 2 is a view taken along line A–A of FIG. 1.

In operation, the motor 10 is started and the regulating servoloop is coupled into the circuit. A "mushrooming" out into the buffer space 4 of the air forced through the utilization space by impeller 7 is represented by arrows A (FIGS. 1 and 2). From the moment the temperature regulating system described is put into operation, a time interval will elapse before a steady state is reached and this time varies in accordance with a number of factors, the more significant being the thermal mass of the object within the utilization space. This is the case where, as in the embodiment described, the utilization space accommodates a permanent magnet for an NMR spectrometer. As soon as steady state is reached, any temperature variations of the utilization space exceeding the tolerance limits will be corrected within a small number of air passes, i.e., complete closed-circuit rounds of the regulating air. The air passes can be reduced in number by increasing the flow velocity up to the rate where turbulent, as distinct from laminar, flow conditions are created. Ambient temperature changes generally occur at a relatively slow rate and there is little difficulty in providing a response of the heat-regulating servoloop which is relatively fast as compared with the changes.

It is noted that the apparatus described regulates properly if it is not subjected to high ambient temperature gradients such as could occur by allowing the sun to shine on one side of the apparatus. Small temperature gradients, however, do not significantly affect the regulating loop.

Thus, an improved thermostating arrangement has been described which advantageously provides a thermal pivot point within an enclosed environment.

While I have illustrated and described a particular embodiment of my invention, it will be understood that various modifications may be made therein without departing from the spirit of the invention and the scope of the appended claims.

We claim:

1. An apparatus having a utilization space and adapted for maintaining an inner zone thereof having a substantial thermal mass positioned therein at a predetermined temperature when the mass exhibits temperature gradients between the inner zone and peripheral parts of the mass, comprising:
  a thermally insulating outer enclosure;
  a thermally insulating inner enclosure positioned within said outer enclosure and forming the boundary of the utilization space, said inner enclosure spaced from said outer enclosure for defining an intermediate buffer space;
  an inlet and juxtaposed outlet positioned in said inner enclosure;
  electrical heating means including an impeller positioned adjacent said inlet for heating and circulating a temperature regulating fluid through said inlet, said utilization space, said outlet, through said buffer space and to said inlets;
  heat sensing means for providing mutually aiding electrical outputs representing the separate temperature integrals with respect to time as sensed in the utilization space at the inlet and the outlet and as sensed in the buffer space at a location between the two openings; and
  electrical circuit means intercoupling said heat sensing means and said heating means for controlling said heating means whereby the apparent temperature coefficient of the inner zone of said thermal mass is variable from a relatively small negative to a relatively small positive value by altering the position of the heat sensing means in the buffer space relative to inlet and outlet.

2. Apparatus as claimed in claim 1, wherein said heat sensing means comprises a heat sensor adjacent the inlet, a heat sensor adjacent the outlet, and a heat sensor positioned in the buffer space intermediate the inlet and outlet.

3. Apparatus as claimed in claim 2 wherein the heat sensors are arranged in relation to said thermal mass, the heating means and to the rate of fluid flow, for establishing a thermal pivot zone.

4. Apparatus as claimed in claim 3, wherein the positioning of the heat sensing means in the buffer space is adjustable so as to shift the thermal pivotal zone for the optimization of the temperature control of said inner zone.

5. Apparatus as claimed in claim 4, wherein the heating means comprise an electrical heating element would in the form of a helix coaxial with the axis of rotation of the impeller.

6. Apparatus as claimed in claim 4, wherein the impeller is driven by a synchronous electric motor external to the outer enclosure.

7. Apparatus as claimed in claim 4, including means for coupling the heat sensors in a mutually aiding arrangement for comparison with reference means and means responsive to a comparison signal for energizing the heating means for establishing equality of effect between the heat sensors and the reference means.